United States Patent
Hutson et al.

(10) Patent No.: US 6,982,573 B2
(45) Date of Patent: *Jan. 3, 2006

(54) SWITCHABLE CLOCK SOURCE

(75) Inventors: Matt Hutson, Bristol (GB); Andrew Dellow, Minchinhampton (GB); Tom Ryan, Bristol (GB); Paul Elliott, Bristol (GB)

(73) Assignee: STMicroelectronics Limited, Bristol (GB)

( * ) Notice: Subject to any disclaimer, the term of this patent is extended or adjusted under 35 U.S.C. 154(b) by 0 days.

This patent is subject to a terminal disclaimer.

(21) Appl. No.: 10/827,675

(22) Filed: Apr. 19, 2004

(65) Prior Publication Data

US 2004/0263217 A1    Dec. 30, 2004

Related U.S. Application Data

(63) Continuation-in-part of application No. 10/157,731, filed on May 29, 2002, now Pat. No. 6,774,681.

(30) Foreign Application Priority Data

May 30, 2001   (EP)   ................................. 01304738

(51) Int. Cl.
   *H03K 17/00*   (2006.01)
(52) U.S. Cl. ........................ 327/99; 327/298
(58) Field of Classification Search ................ 327/99, 327/141, 144, 166, 298, 407
   See application file for complete search history.

(56) References Cited

U.S. PATENT DOCUMENTS

| | | | |
|---|---|---|---|
| 4,855,615 A | 8/1989 | Humpleman | ................. 307/269 |
| 5,448,597 A | 9/1995 | Hashimoto | ................... 375/354 |
| 5,502,409 A | 3/1996 | Schnizlein et al. | ........... 327/99 |
| 5,852,728 A * | 12/1998 | Matsuda et al. | ............ 713/501 |
| 6,239,626 B1 | 5/2001 | Chesavage | ................... 327/99 |
| 6,472,909 B1 | 10/2002 | Young | .......................... 327/99 |
| 6,633,991 B1 * | 10/2003 | Goldrian | ..................... 713/400 |

FOREIGN PATENT DOCUMENTS

EP   0 969 350 A2   1/2000

* cited by examiner

*Primary Examiner*—Linh My Nguyen
(74) *Attorney, Agent, or Firm*—Lisa K. Jorgenson; Robert Iannucci; Seed IP Law Group PLLC

(57) ABSTRACT

A clock source selector for selecting either a first clock signal A or a second clock signal B in accordance with a switch request signal includes three retiming circuits each consisting of two clocked flip-flops. The switch request signal is first retimed relative to clock A to give a signal P, is then retimed relative to clock B to give a signal Q, and finally is retimed relative to clock A to give a signal R. Selector circuitry operates such that when signal Q is asserted, the second clock signal B is output, when neither signal P nor signal R, as combined by a NOR gate, are asserted, the first clock signal A is output, and at other times a zero level is output. The clock source selector can be used in an integrated circuit to form a glitch-free multiplexer.

36 Claims, 5 Drawing Sheets

US 6,982,573 B2

SWITCHABLE CLOCK SOURCE

CROSS-REFERENCE TO RELATED APPLICATION

This application is a continuation-in-part of U.S. patent application Ser. No. 10/157,731, filed May 29, 2002, now U.S. Pat. No. 6,774,681, which application is incorporated herein by reference in its entirety.

BACKGROUND OF THE INVENTION

1. Field of the Invention

This invention relates to a clock source selector which is capable of switching between two asynchronous clock sources with different clock rates and back again in a glitch-free manner. Such a clock source selector is sometimes termed a glitch-free multiplexer.

2. Description of the Related Art

In integrated circuit technology there is sometimes a need to switch between two clock sources which are unrelated in rate and phase. It is important that in such switching any glitch, or short pulse, is avoided. The generation of a glitch is illustrated in FIG. 1 of the drawings, which shows two clock waveforms A and B. A switch request signal indicates whether clock A is required or clock B. If clock A is required the switch request (SW-RQ) signal takes a low value, and if clock B is required the switch request signal takes a high value. If the switch request signal is used directly to select clock A or clock B, the output shown at the bottom of the figure is obtained. This includes a short pulse at the point of the changeover, which is unacceptable for many applications. A similar glitch can occur when switching back from clock B to clock A. A glitch-free multiplexer is designed to overcome this problem, and thus is designed so as not to violate the minimum acceptable pulse width.

Known glitch-free multiplexers use state machines and are relatively complex and difficult to test. There is a need for a reliable glitch-free multiplexer which is easy to make and to test, which is reliable when having to cope with successive switch requests, and which does not introduce unnecessary delay.

BRIEF SUMMARY OF THE INVENTION

A preferred embodiment of the invention, described in more detail below with reference to the drawings, takes the form of a clock source for selecting either a first clock signal A or a second clock signal B in accordance with a switch request signal. The clock source includes three retiming circuits each consisting of two clocked flip-flops. The switch request signal is first retimed relative to clock A to give a signal P, is then retimed relative to clock B to give a signal Q, and finally is retimed relative to clock A to give a signal R. Selector circuitry operates such that when signal Q is asserted, the second clock signal B is output, when neither signal P nor signal R, as combined by a NOR gate, are asserted, the first clock signal A is output, and at other times a logic one level is output in one embodiment. In another embodiment, the output of the NOR gate is prevented from being asserted when signal Q is asserted and the output of the NOR gate is prevented from being de-asserted when the signal Q is de-asserted. The clock source can be used in an integrated circuit to form a glitch-free multiplexer.

BRIEF DESCRIPTION OF THE SEVERAL VIEWS OF THE DRAWINGS

The invention will be described in more detail by way of example with reference to the drawings, in which.

DETAILED DESCRIPTION OF THE INVENTION

A first embodiment of the invention will now be described with reference to FIG. 2 of the drawings.

Figure 1:
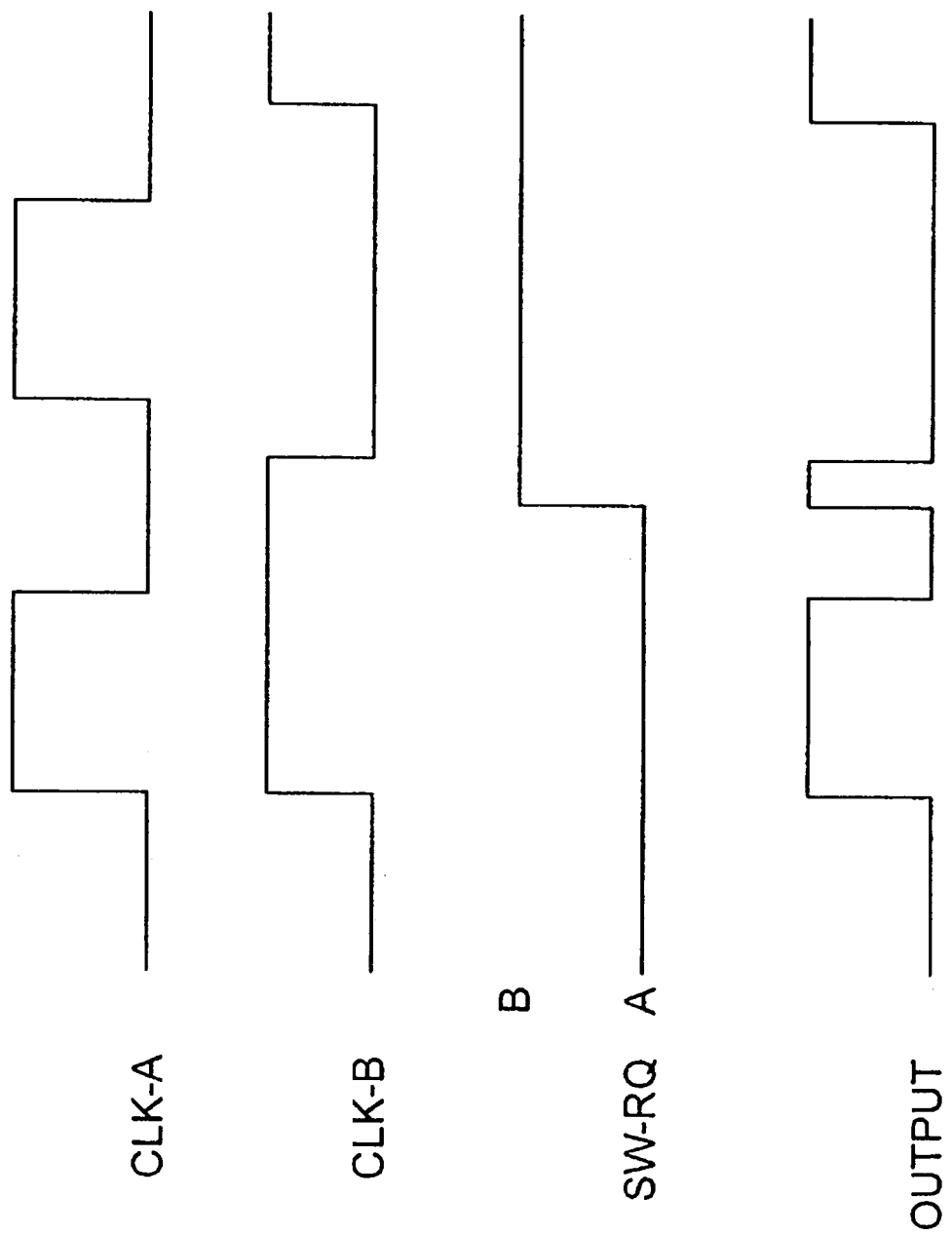
FIG. 1 (referred to above) is a timing diagram illustrating the formation of a glitch.
Figure 2:
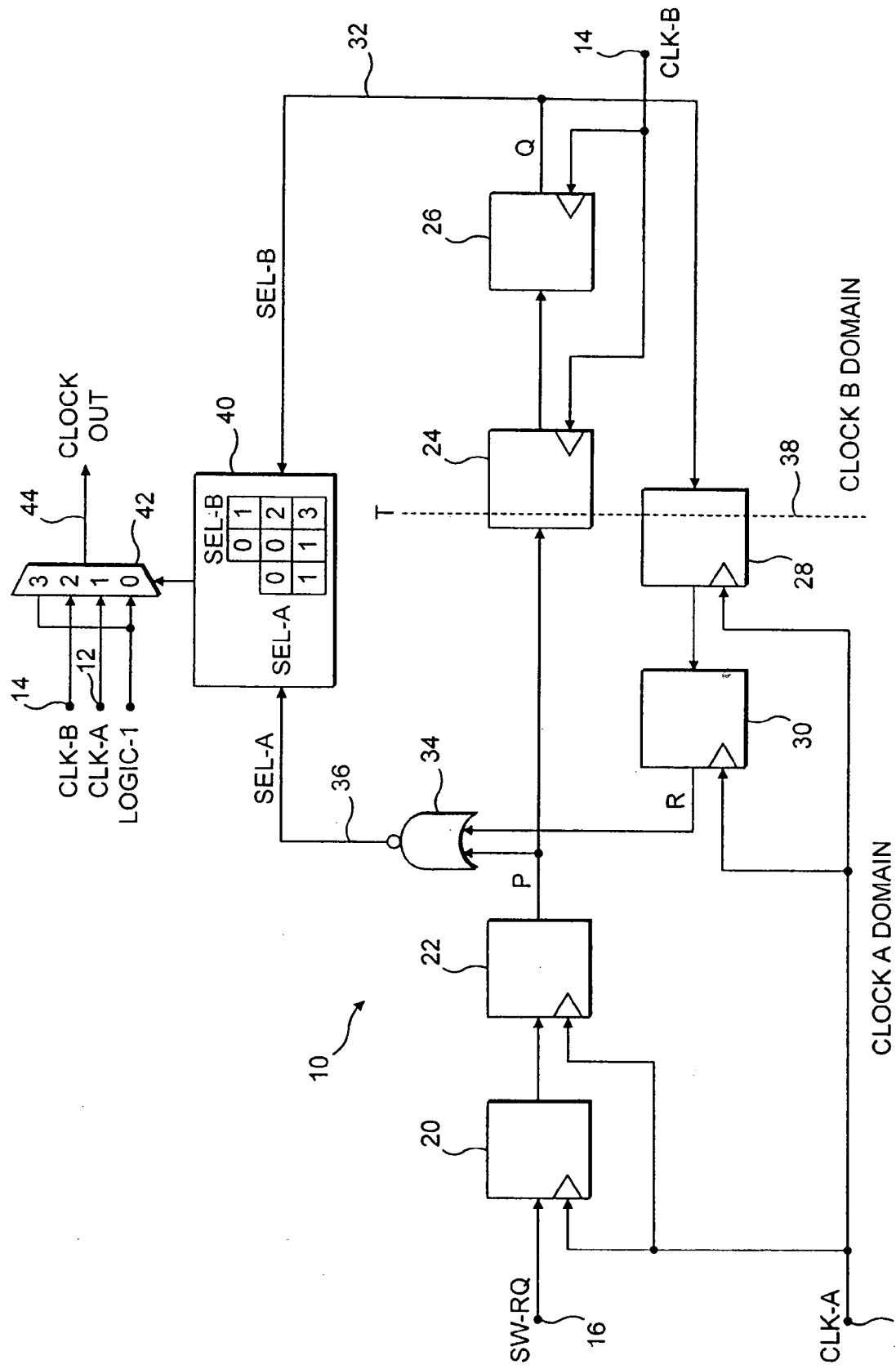
FIG. 2 is a circuit diagram of a glitch-free multiplexer according to a first embodiment of the invention.

The glitch-free multiplexer 10 illustrated in FIG. 2 has an input 12 shown at the bottom left of the Figure for receiving a first clock signal A (CLK-A), an input 14 shown at the right-hand side of the Figure for receiving a second clock signal B (CLK-B), and an input 16 for receiving a switch request signal (SW-RQ). The clocks A and B are asynchronous and unrelated and thus may be of different rate and unrelated phase relationship. The switch request signal is as described above and takes a low value if the output is to follow clock A and a high value if the output is to follow clock B. The switch request signal may therefore be referred to as a 'BnotA' signal.

The construction of the multiplexer 10 is as follows. It is largely constructed from clocked flip-flop or bistable circuits each of which operates to retime the signal applied to its signal input in accordance with a clock input. The switch request signal input is applied to the input of a flip-flop 20 which is connected to input 12 so as to be clocked by clock A. The output of flip-flop 20 is applied to a flip-flop 22 which is also clocked by clock A. The output of flip-flop 22 is supplied to a flip-flop 24 which is connected to input 14 so as to be clocked by clock B. The output of flip-flop 24 is applied to another flip-flop 26 which is also clocked by clock B. The output of flip-flop 26 firstly provides a 'select B' signal SEL-B at an output 32, and secondly is applied to a flip-flop 28 which is connected to input 12 so as to be clocked by clock A. The output of flip-flop 28 is applied to a final flip-flop 30 which is again clocked by clock A. The outputs of flip-flops 22 and 30 are each applied to a respective input of a two-input NOR gate 34, which provides a 'select A' output signal SEL-A at an output 36. The NOR gate 34 provides a high output when and only when both its inputs are low, and is formed by an OR gate with an inverting circuit at its output.

The circuit operates by producing the two outputs SEL-A and SEL-B. These signals are independent to the extent that during a changeover from, say, clock A to clock B, SEL-A is first de-asserted and for a short interval neither SEL-A nor SEL-B is asserted. Then, when it is safe to do so, SEL-B is asserted and clock B takes over.

The manner in which the select signals SEL-A, SEL-B provide an output is also illustrated in FIG. 2. The SEL-A and SEL-B signals are applied to a truth table circuit 40 which controls a four-way selector 42. When both SEL-A and SEL-B are low, a defined logic state such as a logic one input is selected. When SEL-A is high and SEL-B is low, CLK-A is selected by selector 42. When SEL-B is high and SEL-A is low, then CLK-B is selected by selector 42. The situation where both SEL-A and SEL-B are high should not normally arise, but if it did, selector 42 would select the defined logic state such as logic one again. The signals SEL-A and SEL-B would only both be high if the switch request switched from logic 0 (SEL-A asserted) to logic 1 and back again to logic 0 rapidly. If this occurred, there would be a short period when the logic 1 has not propagated through the retiming elements to become signal R meaning that signals P and R would both be de-asserted (SEL-A high) at the same time as signal Q is asserted (SEL-B high). The provision of the defined logic state by the combination of the truth table 40 and multiplexer 42 prevents propagation of a glitch. As the flip-flops within the circuit all clock on the rising edge of the clock input, the defined logic state is chosen to be logic one. The multiplexer output is thus logic one and held at logic one when switching from one clock to another until the clock output can safely be changed to the new clock domain. The output 44 of the selector 42 provides the clock output of the multiplexer.

The operation of the circuit 10 is as follows. First, in flip-flops 20 and 22 the switch request signal is retimed relative to clock A. In accordance with standard practice two successive retiming stages are used for the sake of safety to avoid metastable state propagation. The retimed output of flip-flop 22 may be termed P. Signal P is then retimed by flip-flops 24 and 26 relative to clock B. The retimed output of flip-flop 26 may be termed Q. Signal Q is then retimed back relative to clock A by flip-flops 28 and 30. The retimed output of flip-flop 30 may be termed R.

The signal Q from flip-flop 26 becomes directly the SEL-B signal. The SEL-A signal is generated from a combination of the signals P and R. More particularly, the SEL-A signal is only generated when both the signal P and the signal R are low (de-asserted).

Figure 3:
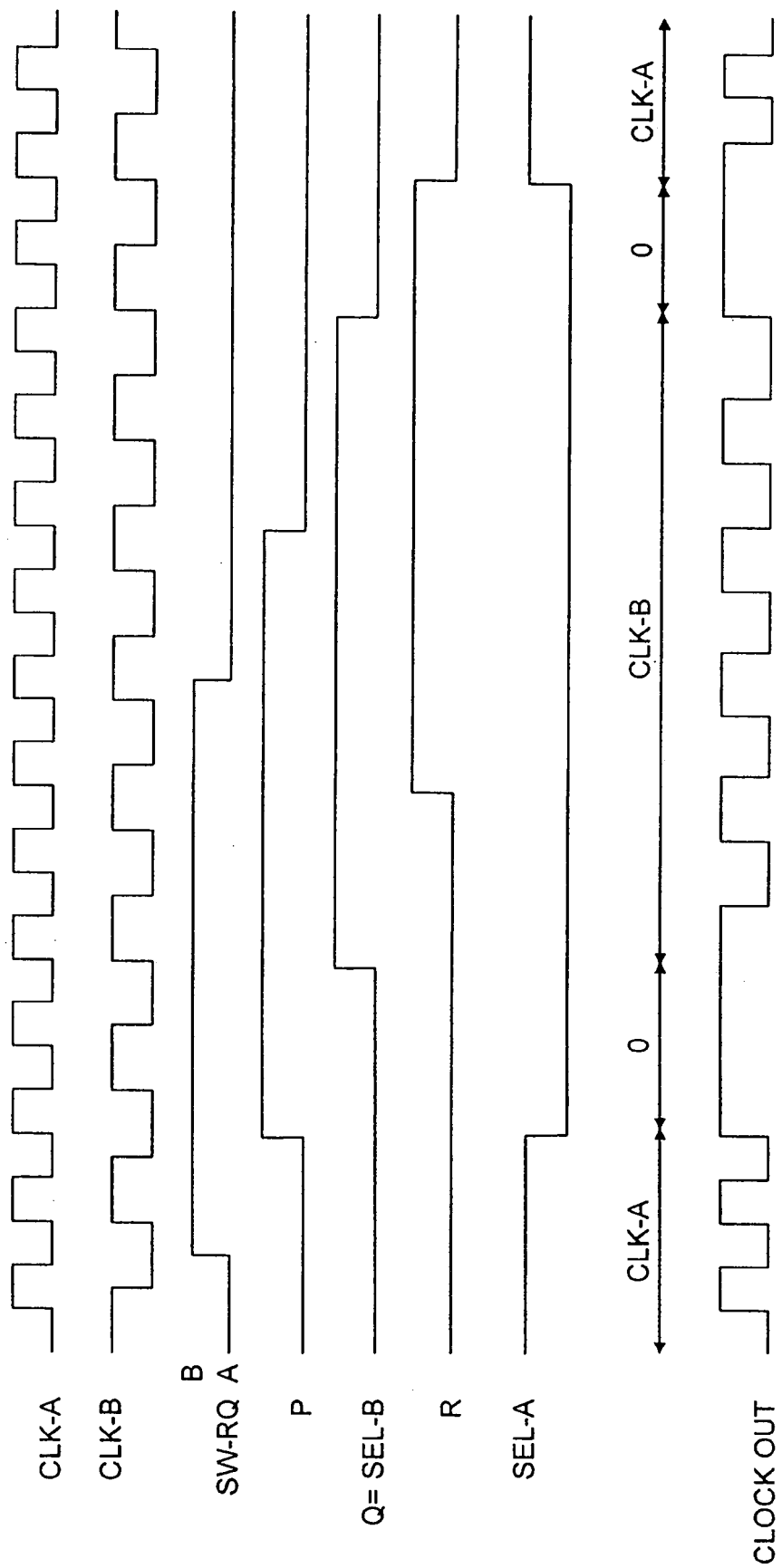
FIG. 3 is a timing diagram illustrating the operation of the multiplexer of FIG. 2.

Reference is now made to the waveform diagram of FIG. 3 to illustrate the operation of the multiplexer. The clock A and clock B signals are shown at the top of the Figure. The switch request signal SW-RQ is assumed initially to be low, requesting clock A, and then to change to high, requesting clock B, and subsequently to change back again. The signal P will be generated from the switch request signal and will change state on the second rising edge in clock A after the state change in the switch request signal. The signal Q will be generated from the signal P and will change state on the second rising edge in clock B after the state change in the signal P. The signal R will be generated from the signal Q and will change state on the second rising edge in clock A after the state change in signal Q. The signal Q is also the output SEL-B. Finally the signal SEL-A is true when neither P nor R is high.

Looking at FIG. 3, it is seen that the effect is that all changes in SEL-A coincide with a pulse of CLK-A and all changes in SEL-B coincide with a pulse of CLK-B. Signal P always precedes Q or SEL-B and signal R always comes after Q or SEL-B. Thus by generating SEL-A only when both P is low and also R is low, the pulses of SEL-B are surrounded by intervals when neither SEL-A nor SEL-B are high, and logic one is applied to the clock output 44 of FIG. 2. The resultant clock out signal is shown at the bottom of FIG. 3 and is seen to contain no glitches.

The whole circuit is entirely synchronous to the extent that all the flip-flops are clocked either by clock A or clock B. The clock boundary 38 between the clock A domain and the clock B domain is shown on FIG. 2. The circuit does not require complex state machines, and is relatively easy both to make and to test. It copes quite happily with successive switch requests, for example where a request to change from clock B to clock A follows closely after a request to change from clock A to clock B. The circuit illustrated is particularly suitable for inclusion in a semiconductor integrated circuit.

Figure 4:
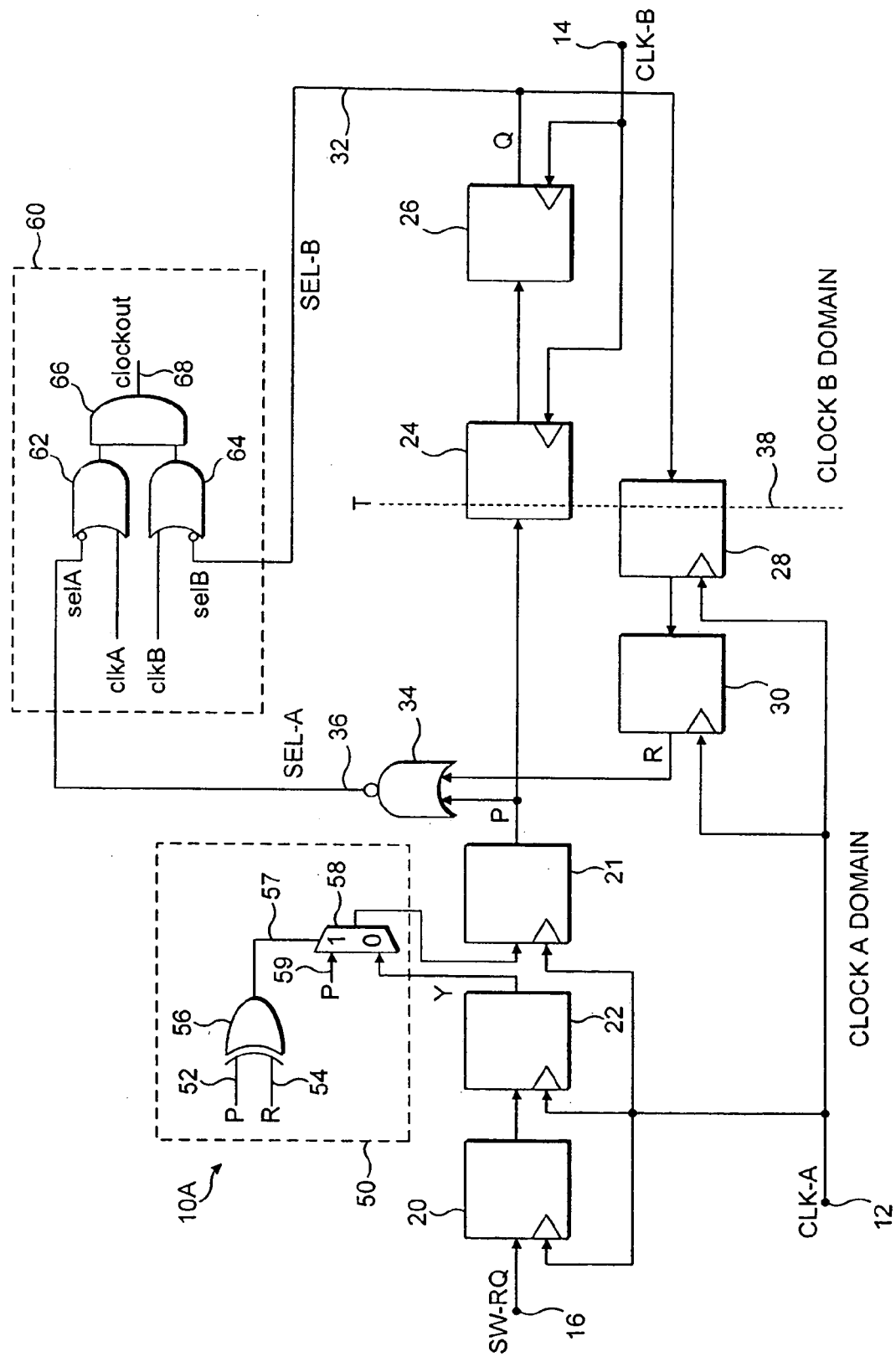
FIG. 4 is a circuit diagram of a glitch-free multiplexer according to a second preferred embodiment the invention.

A glitch-free multiplexer 10A according to a preferred embodiment of the invention will now be described with reference to FIG. 4 of the drawings. Like elements are referenced with the same numerals as the known circuit already described with reference to FIG. 2 for simplicity.

Like the multiplexer 10 of FIG. 2, the glitch-free multiplexer 10A has an input 12 for clock A and an input 14 for clock B. A switch request signal is received at an input 16. The switch request signal takes a low value if the output is to follow clock A and a high value if the output is to follow clock B. The switch request signal may therefore be referred to as a "BNotA" signal.

The construction of the retiming arrangement of the circuit is the same as already described and that description applies equally here. Briefly, the switch request signal is first retimed relative to clock A by a retiming circuit comprising flip-flops 20, 22 to produce a signal from which signal P is derived, is then retimed relative to clock B by a retiming circuit comprising flip-flops 24, 26 to produce a signal Q and is then retimed relative to clock A by a retiming circuit comprising flip-flops 28, 38 to produce a signal R. Two 77 flip-flops are provided for each retiming operation for metastability purposes.

A "select B" signal SEL B is the signal Q taken from the output of flip-flop 26. This is the switch request retimed into the clock B domain. A "select A" signal SEL A is the output of inverted OR gate 34 comprising NOT (P or Q). It is to be noted that the signal R is a delayed version of signal P delayed by a time defined by the retiming circuits between P and R, namely flip-flops 24, 26, 28, 30. The time delay is thus 2×clk A+2×clk B where clk A=one cycle of clock A and clk B=one cycle of clock B. Now provided that the switch request signal P does not change state until it has propagated through the retiming circuits to become switch request signal R, signal P and R will never both be low (de-asserted) unless signal Q is low. This means SEL A is only asserted if SEL B is de-asserted.

Consider the case, however, that the switch request is initially asserted and signals P, Q and R are asserted and the switch request is then de-asserted and then re-asserted in a short period of time (short being less than the time the signal P can propagate to become signal R). In this situation, signal P is de-asserted, then two cycles of clock B later signal Q is de-asserted, and two clock cycles of clock A later signal R is de-asserted. By this time, however, signal P is re-asserted meaning that SEL A is de-asserted (being NOT (P or Q)) and SEL B is de-asserted. Thus neither clock would be selected.

The same problem would occur when the switch request is initially de-asserted and then rapidly changes to asserted and then de-asserted. This would propagate so that there is a point in time when signal Q is asserted, but signals P and Q are both de-asserted. Consequently, both clocks would be selected as both SEL A and SEL B are asserted.

To avoid the possibility of either SEL A and SEL B being asserted at the same time, the circuit is arranged to ensure that signal P cannot change state until signal R is the same state as signal P (the switch request has propagated through the retiming arrangement). This is achieved by either ensuring the switch request signal at input 16 can only change at a rate slower than the propagation through the retiming arrangement, or by using an additional gating arrangement 50.

The gating arrangement 50 is arranged to prevent a switch request from entering the retiming arrangement at a changing rate faster than the rate at which a state charge of the switch request can propagate through the retiming arrangement. As previously described by ensuring this criterion is met, this ensures that the signals to select clock A (SEL A) and clock B (SEL B) cannot be asserted at the same time. As a result, the multiplexer 10A can employ selection circuitry 60 implemented as a simple arrangement of gates rather than the truth table of the selection circuit 40 of the multiplexer 10 of FIG. 2. The gating arrangement 50 comprises an XOR gate 56 which receives signal P as one input on line 52 and signal R as the other input on line 54. The output of the XOR gate 56 is asserted when either P or Q are asserted, but not when either both or neither are asserted. The output of the XOR gate 56 is thus asserted when signal P and signal R differ meaning that the switch request signal has not propagated from signal P to signal R.

The output of the XOR gate 56 is provided on a line 57 to a multiplexer 58. The multiplexer 58 receives two inputs: signal P on line 59 and signal Y. The signal Y is the switch request retimed by the two flip-flops 20, 22 in the clock A domain. The multiplexer 58 effectively gates the signal Y so that the switch request passes only if signal P and signal R are the same. If signal P and signal R differ, then the output of XOR gate 56 is asserted on line 57 and the multiplexer 58 is switched so that signal P on line 59 is presented at the output of the multiplexer. A further flip-flop 21 receives the output of the multiplexer 58 and provides signal P and is provided as a feedback loop. Thus the output of flip-flop 21 comprising signal P is recirculated to its input in the event that signals P and R differ, thus preventing a new switch request signal from entering the retiming arrangement of flip-flops 24, 26, 28, 30. As soon as signal P has propagated through the retiming arrangement to become signal R, the multiplexer 58 is switched so that a state change in the switch request can pass from retiming flip-flops 20 and 22 to the feedback flip-flop 21.

The gating arrangement 50 is optional if the switch request signal is constrained to switch state at a rate slower than the rate of propagation of the switch request from one domain to the other and back again. This can be achieved by determining the maximum delay and ensuring that the switch request signal is derived from a clock running slower than this time delay. In the present case, the time delay is 2×clk A+2×clk B, being the delay introduced by retiming flip-flops 24, 26, 28, 30. Now if clock A is chosen to be the faster of the two clocks, so using a clock which is the speed of clock B divided by 4 will ensure that a switch request will not enter faster than signal P can propagate to signal R. A longer time period such as clock B divided by 6 or 8 may be chosen to provide a safety margin for stability.

In consequence of ensuring that SEL A and SEL B will never be asserted at the same time, the selection circuit 60 can be simplified. The selection circuit comprises two OR gates 62, 64 that respectively receive clock A and clock B at respective first inputs and respectively receive inverted clock selection signals SEL A and SEL B at respective second inputs. When SEL A is asserted, the inverted SEL A signal is zero so OR gate 62 is simply an input follower and clock A is output from gate 62. When SEL B is asserted, the inverted SEL B is zero so OR gate 64 is simply an input follower and clock B is output from gate 64. Given that if SEL A is asserted this means SEL B is de-asserted, while the output of OR gate 62 is clock A, the output of OR gate 64 is necessarily logic 1 (asserted). This means the inputs to AND gate 66 are logic 1 (asserted) and clock A so the output is clock A. Conversely, given that if SEL B is asserted SEL A is necessarily de-asserted, the output of OR gate 62 is logic 1 (asserted) and AND gate 66 becomes an input follower for the signal clock B from OR gate 64. The respective clock signal is taken by AND gate 66 and provided on a single output line 68 "clockout". The selection circuit 60 is thus a simple arrangement of 3 gates. This can be achieved because the selection signals SEL A and SEL B are never asserted at the same time and will only both be de-asserted during a changeover from one clock to another. The selection circuit thus takes a clock switch signal in one clock domain (SEL A) to switch the clock signal in the same domain (clk A) and a second clock switch signal in another domain (SEL B) to switch the clock signal in that other domain (clk B). This can be achieved by two gates, 62, 64, each operating in one clock domain. The third gate simply combines the output of the two gates together. Other gate arrangements are possible, though the select switch signal and corresponding clock should be on the same gate to avoid glitches.

During changeover from one clock to another, there is a period when both sel-A and sel-B are deasserted (logic 0). During this time, the output of OR gates 62, 64 is logic 1, so the output of AND gate 66 on line 68 is logic 1. Thus, there is a defined logic state (logic 1) during changeover from one clock to another.

The operation of the circuit will now be described with reference to the timing diagram of FIG. 5. The overall function of the circuit is to take a switch request signal and to retime the request into two different clock domains so that the retimed switch request can be used to gate respective clock signals. The gating of the clocks is simplified by preventing the switch request signal from entering the circuit faster than it can be retimed.

Figure 5:
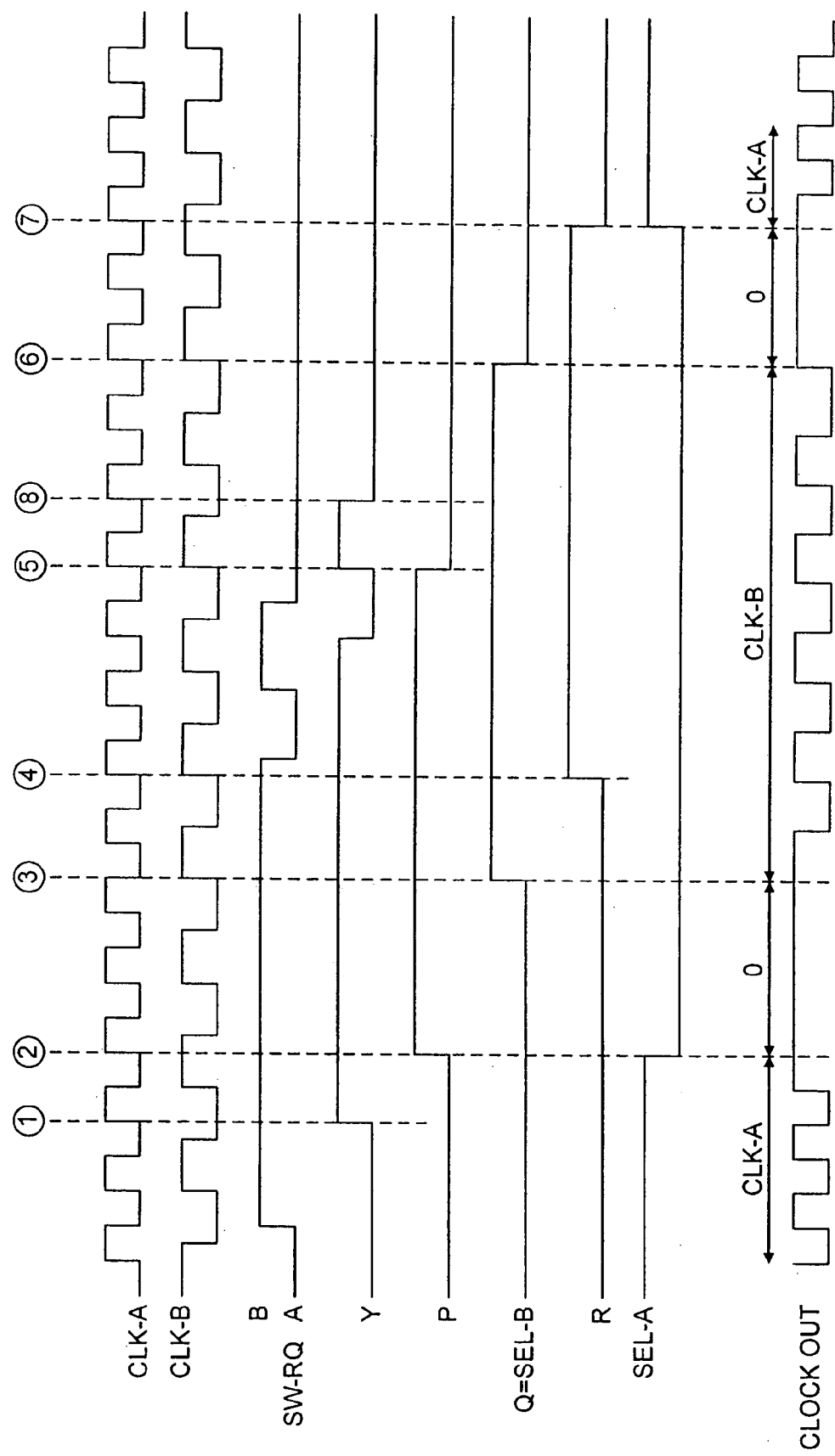
FIG. 5 is a timing diagram illustrating the operation of the multiplexer of FIG. 4.

The timing diagram of FIG. 5 shows a switch request signal asserted at an arbitrary time (not in any phase relationships to either clock A or clock B signals). This is first retimed by flip-flops 20 and 22 so that signal Y is asserted at a time two rising clock edges of clock A later, namely time 1. At that time, signals P and signal R are both de-asserted with the result that XOR gate 56 has a de-asserted output on line 57 and multiplexer 58 connects signal Y to flip-flop 21. Accordingly, signal Y propagates to become signal P one clock cycle of clock A later at time 2. As signal P is asserted signal SEL A is de-asserted so the clock A output is de-asserted. At this time, neither sel-A or sel-B are asserted so the output on line 68 is logic 1 (asserted). Signal P propagates to become signal Q two rising clock edges of clock B later at time 3. At this point, signal SEL B is asserted so the output becomes clock B. Signal Q propagates to become signal R two rising clock edges of clock A later at which point signals P and R are the same with the result that a fresh switch request signal can propagate from signal Y to signal P. At an arbitrary time later the switch request is de-asserted and this propagates to become signal Y two clock periods of clock A later and signal P one clock period of clock A after that at time 5. This switch change request is permitted to propagate to become signal P because signals P and R are the same at that point meaning that multiplexer 58 is switched to allow signal Y to propagate to become signal P as mentioned above. Two rising clock edges of clock B later at time 6 signal Q is de-asserted meaning that both clock A and clock B are de-selected and the output is logic 1 until two clock periods of clock A later at time 7 at which point signal Q propagates to become signal R at time 7 at which point signal SEL A is asserted meaning that clock A is selected.

Consider now the effect of a switch request signal changing from asserted to de-asserted in a short period of time, as shown by the short pulse between time periods 4 and 5 in the switch request signal. Two rising clock periods of clock A after this switch request, namely at time 5, signal Y is asserted. One clock period of clock A later signal P would be asserted as sighal Y propagates to signal P. However, at this point in time, signals P and R differ with the result that the multiplexer 58 is switched so that the input to flip-flop 21 is signal P. Accordingly, signal P is held de-asserted until signal R is de-asserted at time 7, at which point the multiplexer switches to allow signal Y to propagate to become signal P. However, by this time, signal Y is de-asserted. As a result, a short pulse as shown between times 4 and 5 in the switch request only transfers as far as signal Y but does not enter the retiming elements shown by the arrangement of flip-flops 24, 26, 28 and 30 in which the signal is retimed to clock B and then back again to clock A. The situation in which both clock A and clock B are requested is thereby prevented.

Various modifications may be made to the glitch-free multiplexers or clock sources 10, 10A described. If it is known that the switch request signal SW-RQ is always co-timed with clock A, then the flip-flops 20 and 22 can be omitted. In theory, only one flip-flop is needed instead of each of the flip-flop pairs 20,22; 24,26; and 28,30, though this is not preferred for best operation. It does, however, further reduce the delay in the changeover operation. It will be appreciated by those skilled in the art that the logic may be inverted (lows and highs interchanged), either in the circuit as a whole or in selected parts of it, provided that the logical operations effected remain the same. Thus asserting a signal could, in practice, involve taking it from a high value to a low value.

All of the above U.S. patents, U.S. patent application publications, U.S. patent applications, foreign patents, foreign patent applications and non-patent publications referred to in this specification and/or listed in the Application Data Sheet, are incorporated herein by reference, in their entireties.

From the foregoing it will be appreciated that, although specific embodiments of the invention have been described herein for purposes of illustration, various modifications may be made without deviating from the spirit and scope of the invention. Accordingly, the invention is not limited except as by the appended claims.

What is claimed is:

1. A clock source selector for selecting a first clock signal or a second clock signal in accordance with a switch request signal, the clock source selector comprising:
   a first clock input for receiving the first clock signal;
   a second clock input for receiving the second clock signal;
   a switch request signal input for receiving the switch request signal which takes a first value when the first clock signal is required and a second value when the second clock signal is required;
   a first retiming circuit coupled to the switch request signal input and connected to the second clock input to receive the second clock signal for retiming relative to the second clock signal;
   a retiming input signal applied to the first retiming circuit, the retiming input signal being timed relative to the first clock signal and comprising the switch request signal or a signal derived therefrom;
   a second retiming circuit coupled to an output of the first retiming circuit and connected to the first clock input to receive the first clock signal for retiming, relative to the first clock signal, the output of the first retiming circuit; and
   selector circuitry for coupling the second clock input to an output when the output of the first retiming circuit is asserted and for coupling the first clock input to the output when neither the retiming input signal nor an output of the second retiming circuit are asserted.

2. The clock source selector according to claim 1 wherein the first retiming circuit is structured to produce the first retiming signal as a logically equivalent, delayed version of the switch request signal and the second retiming circuit is structured to produce the second retiming signal as a logically equivalent, delayed version of the first retiming signal.

3. A clock source selector according to claim 1, in which the selector circuitry is structured to output a defined logic state when both (i) the output of the first retiming circuit is de-asserted and (ii) either the retiming input signal or the output of the second retiming circuit is asserted.

4. A clock source selector according to claim 3, wherein the selector circuitry comprises a multiplexer with an input of the defined logic state.

5. A clock source selector according to claim 4, wherein the multiplexer is arranged to directly receive the first clock signal and the second clock signal and to select between the first clock signal, the second clock signal and the defined logic state.

6. A clock source selector according to claim 1, in which the selector circuitry includes a two-input NOR gate connected to receive the retiming input signal and the output of the second retiming circuit.

7. A clock source selector according to claim 1, further comprising a third retiming circuit coupled between the switch request signal input and the first retiming circuit and connected to the first clock input to receive the first clock signal for retiming relative to the first clock signal.

8. A clock source selector according to claim 1, in which each retiming circuit comprises two retiming stages.

9. A clock source selector according to claim 1, wherein the first and second clock signals are acted on leading edges of the clock signals.

10. A clock source selector according to claim 1, wherein the first and second clock signals are acted on trailing edges of the clock signals.

11. A clock source selector according to claim 1, further comprising a gating circuit connected between the switch request signal input and the input of the first retiming circuit, the gating circuit having a signal input coupled to the switch request signal input, a first control input coupled to the output of the second retiming circuit, and a second control input coupled to the input of the first retiming circuit, and an output coupled to the input of the first retiming circuit.

12. A clock source selector according to claim 1, wherein the selector circuitry comprises: (i) a first gate having a first input coupled to the first clock and a second input coupled to the switch request signal and to the second retimed switch request signal; and (ii) a second gate having a first input coupled to the second clock and a second input coupled to the first retimed switch request signal.

13. A clock source selector according to claim 1 wherein the clock source selector is incorporated in a semiconductor integrated circuit.

14. A clock source comprising:
   first and second clock signals;
   a switch request signal; and a clock source selector, including:
  a first clock input for receiving the first clock signal;
  a second clock input for receiving the second clock signal;
  a switch request signal input for receiving the switch request signal which takes a first value when the first clock signal is required and a second value when the second clock signal is required;
  a first retiming circuit coupled to the switch request signal input and connected to the second clock input to receive the second clock signal for retiming relative to the second clock signal;
  a retiming input signal applied to the first retiming circuit, the retiming input signal being timed relative to the first clock signal and comprising the switch request signal or a signal derived therefrom;
  a second retiming circuit coupled to an output of the first retiming circuit and connected to the first clock input to receive the first clock signal for retiming, relative to the first clock signal, the output of the first retiming circuit; and
  selector circuitry for coupling the second clock input to an output when the output of the first retiming circuit is asserted and for coupling the first clock input to the output when neither the retiming input signal nor an output of the second retiming circuit are asserted.

15. A clock source according to claim 14, wherein the selector circuitry is structured to provide a defined logic state on the clock output when both (i) the output of the first retiming circuit is de-asserted and (ii) either the retiming input signal or the output of the second retiming circuit is asserted.

16. A clock source selector for selecting a first clock signal or a second clock signal in accordance with a switch request signal, the clock source selector comprising:
  a first clock input for receiving the first clock signal;
  a second clock input for receiving the second clock signal;
  a switch request signal input for receiving the switch request signal which takes a first value when the first clock signal is required and a second value when the second clock signal is required;
  a first retiming circuit having a first input coupled to the switch request signal input, a second input coupled to the second clock input, and an output at which a first retimed signal is produced based on the switched request and second clock signals;
  a second retiming circuit having a first input coupled to the output of the first retiming circuit, a second input coupled to the first clock input, and an output at which a second retimed signal is produced based on the first retimed signal and the first clock input;
  selector circuitry coupled to the first and second retiming circuits and to the first clock input, the selector circuitry being structured to switch an output of the selector circuitry to the second clock signal in response to a state switch in the first retiming signal, and to the first clock signal in response to a state switch in the second retiming signal.

17. The clock source selector of claim 16, wherein the selector circuitry is structured to provide a defined logic state on the selector circuit output when both (i) the output of the first retiming circuit is asserted and (ii) neither the retiming input signal nor the output of the second retiming circuit are asserted.

18. The clock source selector of claim 17, further comprising a third retiming circuit having a first input coupled to the switch request signal input, a second input coupled to the first clock input, and an output coupled to the first input of the first retiming circuit and to the selector circuitry.

19. The clock source selector of claim 16, in which the selector circuitry includes a NOR gate having a first input coupled to the switch request signal input, a second input coupled to the output of the second retiming circuit, and an output.

20. The clock source selector of claim 19, wherein the selector circuitry comprises a multiplexer with a first control input coupled to the output of the NOR gate, a second control input coupled to the output of the first retiming circuit, a first signal input coupled to the first clock input, a second signal input coupled to the second clock input, and an output acting as the selector circuitry output.

21. The clock source selector of claim 20, wherein the multiplexer includes a third signal input that receives a defined logic state.

22. The clock source selector of claim 16, further comprising a gating circuit connected between the switch request signal input and the input of the first retiming circuit, the gating circuit having a signal input coupled to the switch request signal input, a first control input coupled to the output of the second retiming circuit, a second control input coupled to the input of the first retiming circuit, and an output coupled to the input of the first retiming circuit.

23. The clock source selector of claim 16, wherein the selector circuitry comprises: (i) a first gate having a first input coupled to the first clock and a second input coupled to the input of first retiming circuit and to the output of the second retiming circuit; and (ii) a second gate having a first input coupled to the second clock and a second input coupled to the output of the first retiming circuit.

24. A method of switching an output between a first clock signal and a second clock signal under control of a switch request signal, comprising:
  producing a first retiming signal as a delayed version of the switch request signal, the first retiming signal being delayed under control of the second clock signal;
  producing a second retiming signal as a delayed version of the first retiming signal, the second retiming signal being delayed under control of the first clock signal;
  switching the output to the second clock signal in response to a first state switch in the first retiming signal; and
  switching the output to the first clock signal in response to a state switch in the second retiming signal.

25. The method of claim 24, further comprising switching the output to a defined logic state when both (i) the second retiming signal is asserted and (ii) neither the switch request signal nor the first retiming signal are asserted.

26. The method of claim 25 wherein, after switching the output to the defined logic state, the output remains in the defined logic state until switched to the second clock signal in response to the first state switch in the first retiming signal.

27. The method of claim 25, further comprising switching the output from the second clock signal to the defined logic state in response to a state switch in the first retiming signal.

28. The method of claim 24, further comprising producing an intermediate retiming signal as a delayed version of the switch request signal, the intermediate retiming signal being delayed under control of the first clock signal, wherein the first retiming signal is produced by delaying the intermediate retiming signal.

29. The method of claim 24, further comprising producing an intermediate retiming signal as a delayed version of the switch request signal, the intermediate retiming signal being delayed under control of the first clock signal, wherein the output is switched from the first clock signal to the defined logic state in response to a state switch in the intermediate retiming signal.

30. A clock source incorporated in a semiconductor integrated circuit for selecting a first clock signal or a second clock signal in accordance with a switch request signal, the clock source comprising:
a first clock input for receiving the first clock signal;
a second clock input for receiving the second clock signal;
a switch request signal input for receiving the switch request signal which takes a de-asserted value when the first clock signal is required and an asserted value when the second clock signal is required;
a retiming input signal comprising the switch request signal or a delayed version of the switch request signal;
a first retiming circuit having a first input coupled to the retiming input signal, and a second input coupled to the second clock input, and an output at which a first retimed switch request signal is produced relative to the second clock signal;
a second retiming circuit having a first input coupled to the output of the first retiming circuit, a second input coupled to the first clock input, and an output at which a second retimed switch request signal is produced relative to the first clock signal;
selector circuitry coupled to the first and second retiming circuits and to the first and second clock inputs and being arranged to switch an output of the selector circuitry to the first clock signal in response to de-assertion of the second retimed switch request signal and to the second clock signal in response to assertion of the first retimed switch request signal;
wherein the retiming input signal has a rate of state change between the de-asserted value and the asserted value, the first and second retiming circuits have a rate of retiming, and the rate of state change of the retiming input signal does not exceed the rate of retiming of the first and second retiming circuits.

31. A clock source according to claim 30, wherein the switch request signal has a rate of state change that does not exceed the rate of retiming of the first and second circuits.

32. A clock source according to claim 30, further comprising a gating arrangement coupling the first input of the first retiming circuit to the switch request signal input, the gating arrangement being arranged to prevent the rate of state change of the retiming input signal at the first input of the first retiming circuit exceeding the rate of retiming of the first and second retiming circuits.

33. A clock source according to claim 32, wherein the gating arrangement comprises a switch arranged to maintain the state of the retiming input signal at the first input of the first retiming circuit if the state of the switch request signal at the first input of the first retiming circuit and the state of the second retimed switch request signal differ.

34. A clock source according to claim 30, wherein the selector circuitry comprises: (i) a first gate having a first input coupled to the first clock and a second input coupled to the switch request signal and to the second retimed switch request signal; and (ii) a second gate having a first input coupled to the second clock and a second input coupled to the first retimed switch request signal.

35. A clock source according to claim 34, wherein the first and second gates are OR gates.

36. A clock source according to claim 35, wherein the selector circuitry further comprises an AND gate having two inputs coupled to outputs of the first and second OR gates.

* * * * *